June 5, 1945.   A. T. SCHEIWER   2,377,812
COUPLING
Filed Jan. 20, 1943   4 Sheets-Sheet 1

INVENTOR.
Albert T. Scheiwer

June 5, 1945. A. T. SCHEIWER 2,377,812
COUPLING
Filed Jan. 20, 1943 4 Sheets-Sheet 2

Inventor
Albert T. Scheiwer

June 5, 1945.  A. T. SCHEIWER  2,377,812
COUPLING
Filed Jan. 20, 1943  4 Sheets-Sheet 3
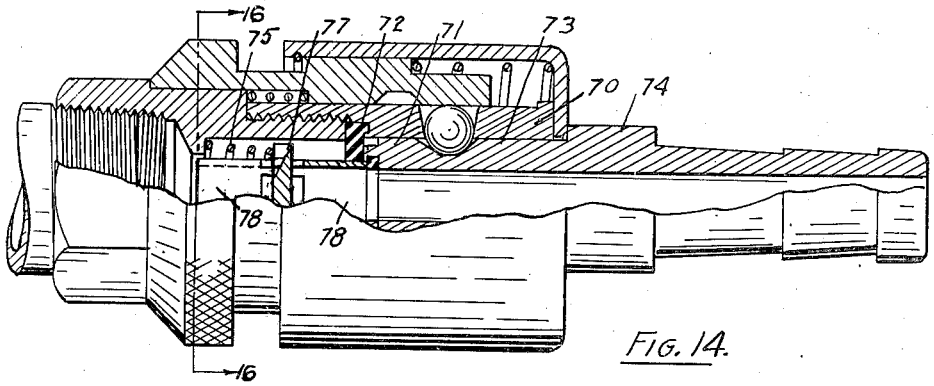
Fig.14.
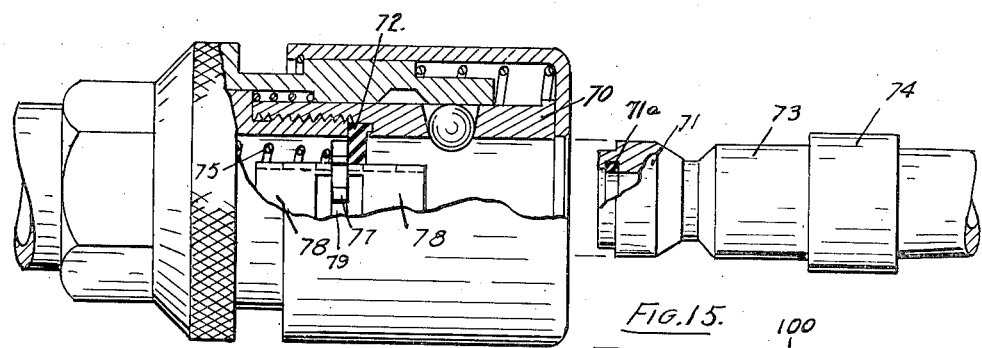
Fig.15.
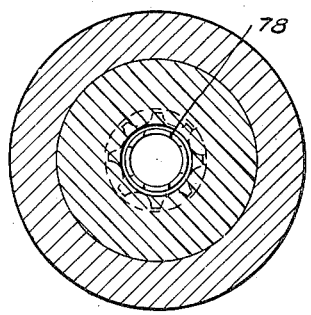
Fig.16.
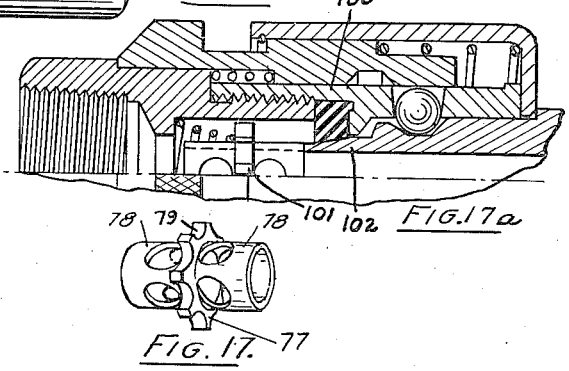
Fig.17a.
Fig.17.
Inventor
Albert T. Scheiwer

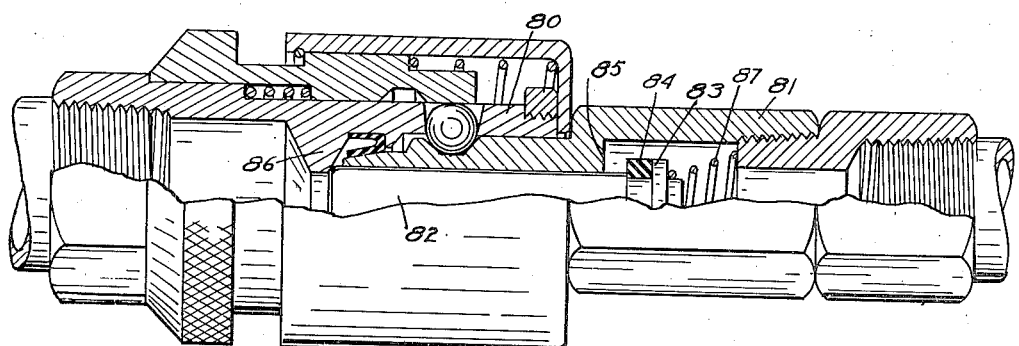
Fig. 18
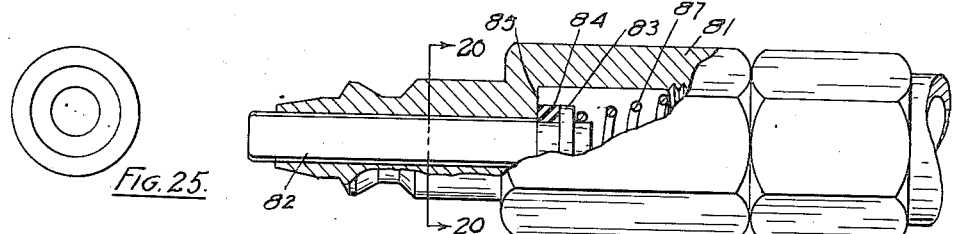
Fig. 25.
Fig. 19.
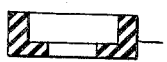
Fig. 26.
Fig. 21
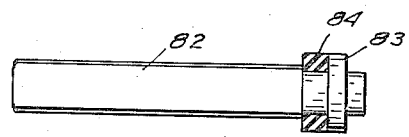
Fig. 20.
Fig. 22.
Fig. 23.
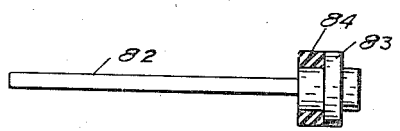
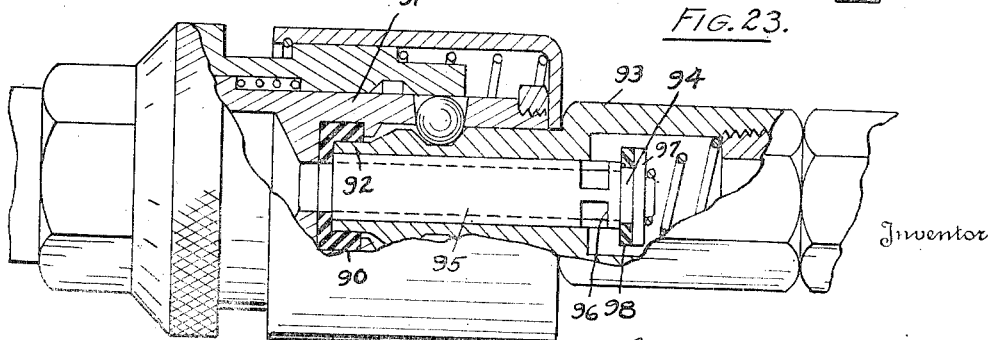
Fig. 24.

Patented June 5, 1945

2,377,812

UNITED STATES PATENT OFFICE 2,377,812

COUPLING

Albert T. Scheiwer, Erie, Pa.

Application January 20, 1943, Serial No. 473,032

7 Claims. (Cl. 285—169)

This application relates generally to couplings, and more particularly to swiveling, quickly attachable and detachable couplings.

All devices of this character made according to the teachings of the prior art, and with which I am familiar, especially those having check valves, have had a restricted area for the passage of fluid. Many couplings now on the market do not swivel and they become uncoupled in use. Prior couplings required two hands to make the coupling, which has been a hindrance in many situations.

The check valves in prior couplings have a tendency to tilt thereby locking it, and thereby permitting free flow of fluid.

It is accordingly, an object of my invention to overcome the above and other defects in couplings and it is more particularly an object of my invention to provide a quickly attachable and detachable coupling which is simple in construction, economical in cost and manufacture, easy to operate, and efficient in operation.

Another object of my invention is to provide a fluid tight swiveling coupling which can be snapped together with one hand.

Another object of my invention is to provide a coupling which is detachable only by the intervention of manual means.

Another object of my invention is to provide a coupling having a check valve disposed thereon which has a maximum unrestricted area for the flow of fluid therethrough.

Another object of my invention is the provision of a novel check valve in a coupling.

Another object of my invention is to provide a coupling wherein a snap connection can be made by merely inserting the male member into the female member.

Other objects of my invention will become evident from the following detailed description taken in conjunction with the accompanying drawings, in which:

Fig. 14 is a side elevational view with parts broken away of my novel coupling showing another form of check valve.

Fig. 15 is an exploded side elevational view with parts broken away of the coupling shown in Fig. 14.

Fig. 16 is a view taken on the line 16—16 of Fig. 14.

Fig. 17 is a perspective view of the check valve in my novel coupling shown in Fig. 14.

Fig. 17a is a fragmentary side elevational view with parts broken away of another form of male connecting member used with the check valve shown in Fig. 17.

Fig. 18 is a side elevational view with parts broken away of my novel coupling showing the check valve in the male member.

Fig. 19 is a side elevational view with parts broken away of the male member shown in Fig. 18.

Fig. 20 is a view taken on the line 20—20 of Fig. 18.

Fig. 21 is an end elevational view of the check valve shown in Fig. 18.

Figs. 22 and 23 are side elevational views in two different planes of the check valve shown in Fig. 18.

Fig. 24 is a side elevational view with parts broken away of a coupling substantially the same as shown in Fig. 18 with the exception of different sealing means for the end of the male member.

Fig. 25 is an end view of the washer shown assembled in Fig. 24.

Fig. 26 is a side elevational view in cross-section of the washer in Fig. 25.

Figure 1:
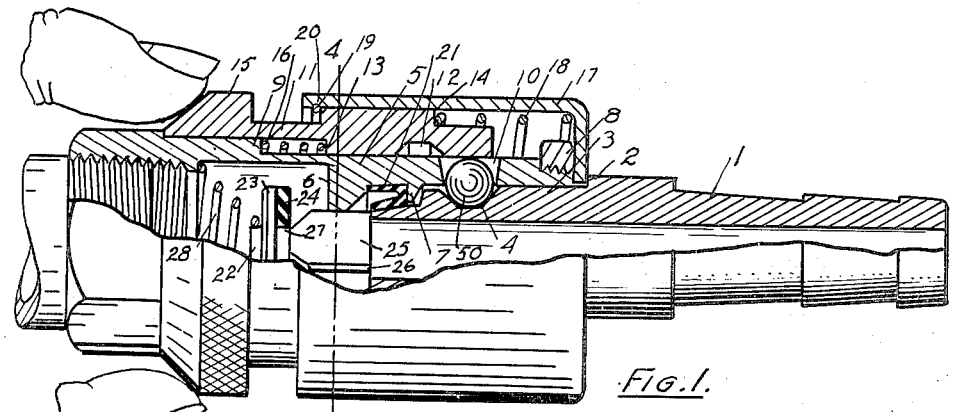
Fig. 1 is a side elevational view with parts broken away of my novel coupling in a locked position.
Figure 2:
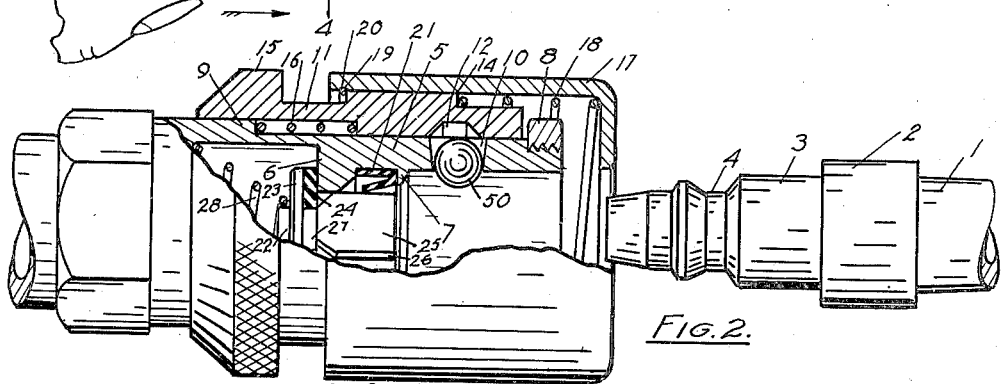
Fig. 2 is an exploded side elevational view with parts broken away of my novel coupling in an unlocked position.

Referring now to the drawings, Figs. 1 to 6 shows a male member 1 having a shoulder 2, a connecting portion 3 and an annular groove 4. A female member 5 has spaced internal shoulders 6 and 7, a threaded stop member 8, a raised annular external shoulder 9 and ball retaining apertures 10. A sleeve 11 surrounding the female member 5 and movable longitudinally thereon has an internal groove 12, internal and external shoulders 13 and 14, and a handle portion 15. A spring 16 engages the inner shoulder 13 of the sleeve 11 and the external shoulder 9 of the female member 5 to normally urge the groove 12 in the sleeve 11 in alignment with ball retaining apertures 10 in the female member 1 to permit outward movement of the ball members 50 when the male and female members 1 and 5 are in an unlocked position as shown in Figure 2. A cylindrical cover 17 is disposed over the sleeve 11 and female member 5 and houses a spring 18 to urge the external shoulder 14 on sleeve 11 against a spring locking clip 19 disposed in a groove 20 on the inner side of the cover 17.

A U-shaped washer 21 is disposed between the internal shoulders 6 and 7 of the female member 5 to engage the end of the connecting portion 2 of the male member 1 to provide a fluid-tight seal.

Figure 5:
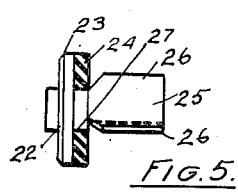
Fig. 5 is a side elevational view of the check valve in my novel coupling.
Figure 6:
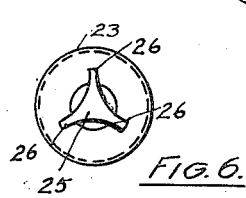
Fig. 6 is an end elevational view of the check valve shown in Fig. 5.

A longitudinally movable check valve 22 shown specifically in Figs. 5 and 6 comprises a plate 23, a washer 24 on the face of the plate which seats on the internal shoulder 6 of the female member 5, and an axially extending contacting member 25 having radially extending fins 26 and cutaway portions 27 adjacent the plate 23. The contacting member 25 is engaged by the connecting portion 2 of the male member 1 when it is in engagement with the female member 5 to push the washer 24 on the plate member 23 away from the internal shoulder 6 of the female member 5. By providing a valve with radially extending fins 26 with cut-away portions 27 immediately adjacent the plate member 23, a maximum internal area for the flow of liquid through the coupling is provided as will be apparent upon inspection. A spring 28 urges the plate member 23 and washer 24 against the internal shoulder 6 of the female member 5 when the male and female members 1 and 5 are not connected to provide a fluid-tight seal.

Figure 3:
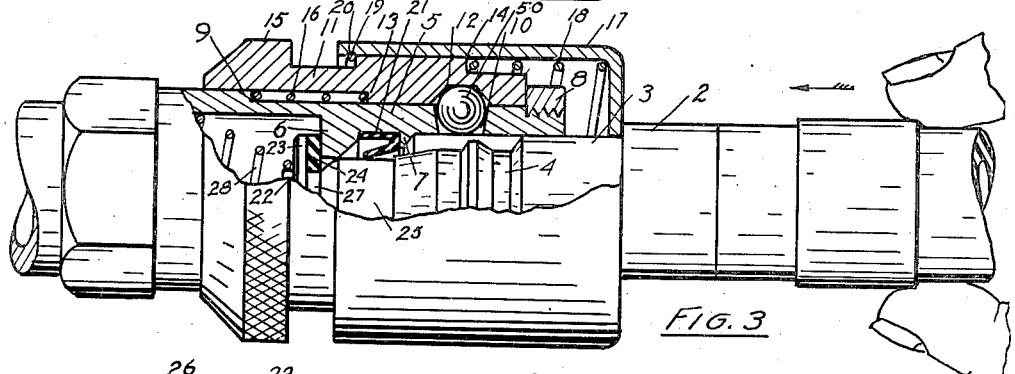
Fig. 3 is a side elevational view with parts broken away of my novel coupling with the male member about to enter the female member.
Figure 4:
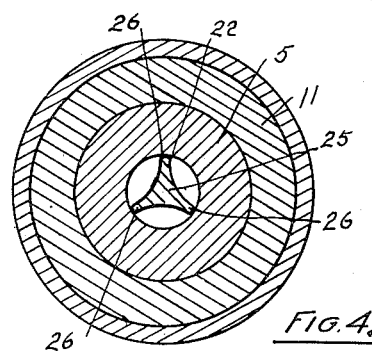
Fig. 4 is a view taken on the line 4—4 of Fig. 3.

In operation, the parts of the female member 5 before connection is as shown in Fig. 2 with the ball members 50 free to move outwardly in the groove 12 in the sleeve 11. Upon insertion of the connecting portion of the male member 1 into the female member 5 as shown in Fig. 3, the cover 17 is forced longitudinally relative to the sleeve 11 to a position where it is stopped by the end of the female member 5 and the stop member 8. This movement of the cover 17 compresses the spring 18 which forces the sleeve 11 longitudinally when the ball members 50 move into the annular groove 4 on the male member 1 to lock the ball members 50 securely into engagement with the groove 4 on the male member 1 thereby locking the male and female members 1 and 5 together. The final position of the cover 17 and the sleeve 11 is as shown in Fig. 1. In the operation of the check valve 22, the connecting portion 2 of the male member 1 engages the contacting member 25 and moves the plate member 23 and washer 24 away from the internal shoulder 6 in the female member 5 thereby permitting free flow of fluid through the coupling.

To disconnect the coupling the handle portion 15 of the sleeve 11 is grasped and pushed longitudinally against the force of the spring 18 until the internal groove 12 of the sleeve 11 is in alignment with the ball retaining apertures 10 in the female member 5 to free the ball members 50 from engagement with the groove 4 in the male member 1 thereby disconnecting the male member 1 from the female member 5. Upon withdrawal of the male member 1, the plate member 23 and washer 24 will be urged to sealing relationship with the internal shoulder 6 of the female member 5 by the spring 28.

Figure 7:
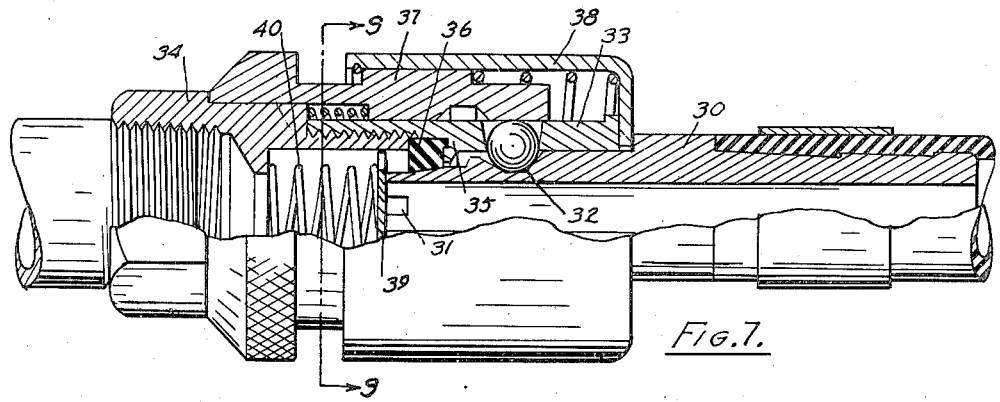
Fig. 7 is a side elevational view with parts broken away of a modified form of my invention.
Figure 8:
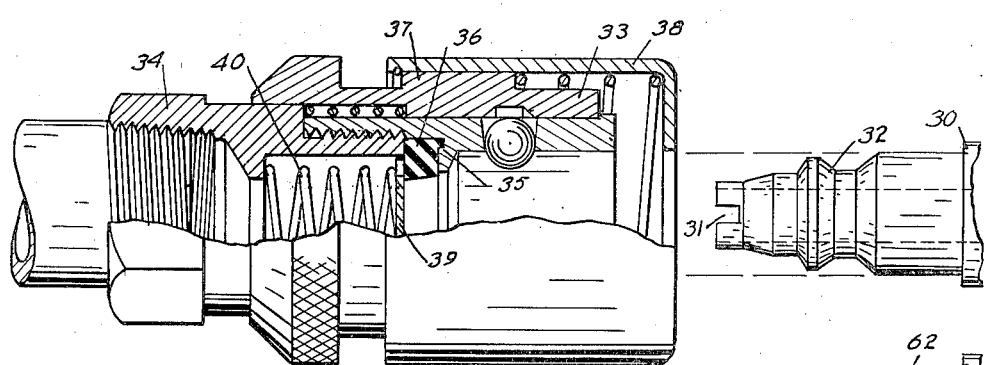
Fig. 8 is an exploded side elevational view with parts broken away of the coupling shown in Fig. 7.

Figs. 7, 8, 9, and 10 show a coupling similar to the coupling shown in Figs. 1 to 6 having a male member 30 with a slotted end portion 31 and groove 32. The female member 33 has a threaded connecting portion 34, an internal shoulder 35, and a washer 36 disposed adjacent the shoulder 35. The sleeve 37 and cover 38 are the same and operate in the same manner as those described in Fig. 1. The plate member 39 (Fig. 10) is urged against the washer 36 by the spring 40 to form a seal when the coupling is disconnected. The plate member 39 is moved to an open position by the slotted end portion 31 of the male member 30. Except for a few minor changes it will be evident that the construction of the coupling shown in Figs. 7 and 8 is substantially the same as the coupling shown in Fig. 1.

Figure 11:
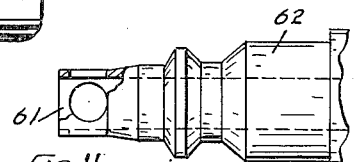
Fig. 11 is a side elevational view of another form of the connecting portion of the male member.
Figure 9:
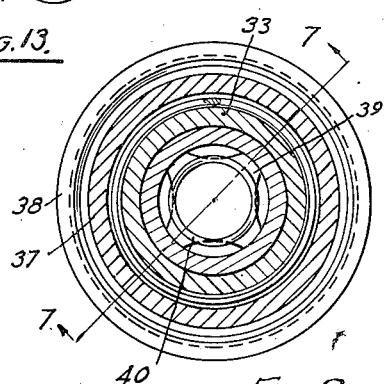
Fig. 9 is a view taken on the line 9—9 of Fig. 7.

Fig. 11 shows a male coupling member 62 having an apertured end 61 for use in applicant's female member 33.

Figure 13:
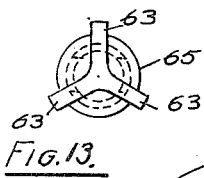
Fig. 13 is an end view of the check valve used in the coupling shown in Fig. 12.
Figure 12:
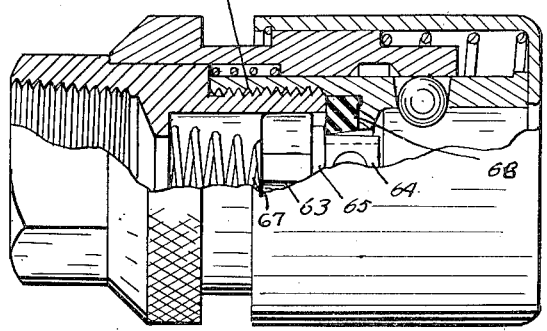
Fig. 12 is a side elevational view with parts broken away of my novel coupling showing another form of check valve for use in my novel coupling.
Figure 10:
Fig. 10 is a perspective view of the check valve plate shown in Fig. 7.

Fig. 12 shows a coupling with a female member 60 and washer 66 of exactly the same construction as the female member 33 shown in Figs. 7 and 8. Another form of check valve shown particularly in Fig. 13 comprises guiding fins 63 and apertured contacting portion 64 on the plate member 65 of the check valve. In operation, the male member engages the contacting portion 64 upon entering the female member 60 to move the plate member 65 away from the washer 66 to permit the free flow of fluid. A spring 67 urges the plate member 65 into sealing engagement with the washer 66 when the coupling is disconnected.

Figs. 14, 15, 16, and 17 show a coupling having a female member 70 and washer 72 of substantially the same construction as the female members 33 and 60 shown in Figs. 7 and 12. A male member 74 has a head 71 on the connecting portion 73 for abutting in sealing relationship with the washer 72. An internal annular washer 71a in the head 71 engages apertured tubular portions 78 of a check valve with a centrally disposed guiding flange 78 having longitudinally extending grooves 79 around the circumference thereof for the passage of fluid. It will be noted that a double seal is provided in this form of coupling and the check valve may be reversed. The guiding flange 78 is made of such width that there is no cocking of the check valve thereby always assuring a perfect seal when the male and female members 70 and 74 are disconnected and a spring 75 urges the flange 77 in sealing relationship with the washer 72 in the female member 70.

In operation, the check valve may be assembled with either tubular end 78 adapted to engage the washer 71a in the head 71. When the male member 74 is inserted in the female member 70, the washer 71a engages the tubular portion 78 to force the flange 77 away from the washer 72 to permit the free flow of fluid through the coupling.

Fig. 17a shows a female member 100 of substantially the same construction as the female member 70 shown in Fig. 14. The check valve 101 is the same as the check valve shown in Figs. 14 and 17. The particular difference is the use of a conventional male member 102 to engage the check valve 101. The operation is the same as that described for the check valve and coupling in Fig. 14.

Figs. 18 to 23 show a female member 80 and parts connected therewith of the same construction as the female member 5 and parts connected therewith shown in Fig. 1. A check valve is disposed in the male member 81 rather than in the female member as in Fig. 1. The check valve comprises a flat engaging portion 82, a shoulder 83, and an annular washer 84 which seats on the internal shoulder 85 in the male member 81. The washer 84 and shoulder 83 is pushed away from the internal shoulder 85 of the male member 81 automatically when the male member 81 is disposed in the female member 80 and the engaging portion 82 of the check valve engages the internal shoulder 86 in the female member 80. A spring 87 urges the washer 84 and shoulder 83 against the shoulder 85 in the male member 81 to form a seal when the male and female members 80 and 81 are disconnected.

The operation of the male and female members 80 and 81 and connecting parts is exactly the same as all those previously described with the exception of the check valve which is disposed in the male member 81 and which is opened by engagement of the engaging portion 82 of the check valve with the internal shoulder 86 in the female member 80.

Figs. 24, 25, and 26 show a coupling substantially the same as that shown in Fig. 18, except for the cup-shaped washer 90 disposed in the female member 91 which engages the end portion 92 of the male member 93. The check valve 94 in the male member 93 operates in exactly the same manner as the check valve in Fig. 18 and comprises a tubular portion 95, apertures 96, plate member 97, and washer 98. The washer 90 provides sealing engagement with the end and side portions of the end 92 of the male member 93. The fluid passes through the apertures 96 of the tubular portion 95 when the male and female members are connected together.

It will be seen from the foregoing description that I have provided a quickly attachable and detachable swiveling coupling which can be coupled by merely inserting the connecting portion of the male member into the female member and which is not easily disconnected by movement of the coupling on the ground.

Various changes may be made in the specific embodiment of the present invention without departing from the spirit thereof, or the scope of the appended claims.

What I claim is:

1. In a quickly attachable and detachable coupling, in combination, a female member having ball retaining apertures, a male member having an annular groove, ball members for engaging the groove on said member to connect said male and female members together, a spring-urged sleeve having a groove normally in alignment with the ball retaining apertures in said female member, a spring for urging the groove in said sleeve away from said ball retaining apertures in said female member, a cover for housing said spring and a portion of said sleeve, and a stop member for holding said sleeve on said female member, said ball members being automatically locked in engagement with the groove on said male member by movement of said sleeve when said cover is moved by said male member upon entrance thereof in said female member.

2. In a quickly attachable and detachable coupling, in combination, a male member having a reduced connecting portion with an annular groove, a female member having ball retaining apertures, ball members disposed in said apertures, a sleeve having an inner annular groove, a spring normally holding the groove in said sleeve in alignment with said ball retaining apertures in said female member, a stop member for holding said sleeve on said female member and spring means for urging said sleeve over said ball retaining apertures to lock said ball members in engagement with the groove on said male member when said male member is disposed in said female member.

3. In a quickly attachable and detachable coupling as set forth in claim 2 wherein manual means are provided for moving said sleeve against the force of said second-mentioned spring means to align said groove on said sleeve with the ball-retaining apertures in said female member to free the balls therein from engagement with the groove on said male member.

4. In a quickly attachable and detachable coupling, in combination, a female member having ball retaining apertures, a male member having an annular groove, ball members disposed in said ball retaining apertures, a sleeve for holding said ball members in engagement with the groove on said male member to secure said male and female members together, said sleeve having a groove normally disposed over said ball retaining apertures to free said ball members from engagement with said groove on said male member, a spring for urging the groove on said sleeve to a position in alignment with said ball retaining apertures, a cover disposed around said sleeve, and a spring in said cover adapted to urge said sleeve in locking engagement with said ball members to secure said male and female members together.

5. In a quickly attachable and detachable coupling, in combination, a female member having ball retaining apertures, a male member having an annular groove, ball members disposed in said ball retaining apertures, a longitudinally movable sleeve for holding said ball members in engagement with the annular groove in said male member for securing said male and female members together, said sleeve having a groove normally disposed over the ball-retaining apertures in said female member freeing said ball members for movement in said apertures, a spring member urging the grooved portion of said sleeve over said ball retaining apertures, a cover disposed over a portion of said sleeve, and a spring disposed in said cover urging said sleeve in locking relationship with said ball members when said male member is entered into said female member.

6. In a quickly attachable and detachable coupling, in combination, a male member having an annular groove, a female member having radially extending apertures, ball members disposed in said apertures, means for automatically locking said ball members into engagement with said groove on said male member to secure said male and female members together when said male member is inserted into said female member, and means movable in the direction of the engaged male member for disengaging said locking means to free said male and female members.

7. A quickly attachable and detachable coupling as set forth in claim 6 wherein a spring-urged locking sleeve has a groove normally in a position to free said ball members and movable longitudinally to automatically lock said ball members in engagement with the groove on said male member when said male member is inserted into said female member.

ALBERT T. SCHEIWER.